US000001083H

United States Statutory Invention Registration [19]

[11] Reg. Number: H1083

Meyer et al.

[43] Published: Aug. 4, 1992

[54] METHOD FOR REMOVING SMALL GAS BUBBLES FROM A LIQUID STREAM

[76] Inventors: James P. Meyer, 2801 Loch Haven Dr., Plano, Tex. 75023; Lloyd A. Baillie, 3529 Appalachian Ct., Plano, Tex. 75075

[21] Appl. No.: 776,944

[22] Filed: Oct. 15, 1991

[51] Int. Cl.[5] ..... G01N 11/00

[52] U.S. Cl. ..... 73/61.41; 55/36; 55/159; 73/61.44; 73/61.45; 73/61.48; 73/61.49; 73/61.75; 73/61.71; 73/61.79

*Primary Examiner*—Bernarr E. Gregory
*Attorney, Agent, or Firm*—F. Lindsey Scott

[57] ABSTRACT

A method for removing small gas bubbles from a liquid stream to produce a liquid stream having a reduced number of gas bubbles by increasing the pressure on the liquid stream.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

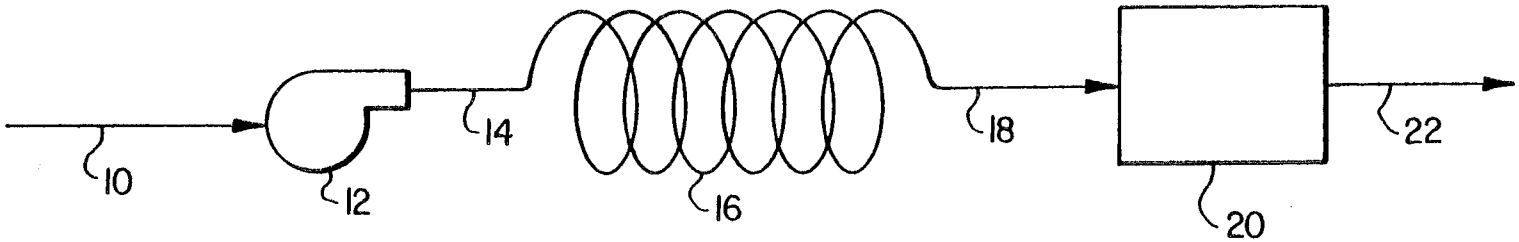
10
12
14
16
18
20
22

METHOD FOR REMOVING SMALL GAS BUBBLES FROM A LIQUID STREAM

BACKGROUND OF THE INVENTION

FIELD OF THE INVENTION

This invention relates to a method for removing small gas bubbles from a liquid stream. The removal of such small gas bubbles facilitates analysis of the liquid stream in optical and acoustical testers.

BACKGROUND

In many industrial applications it is desirable to analyze liquid streams for entrained materials such as immiscible dispersed liquids, finely divided particulate solids and the like. Many such analyses are done using acoustical or optical testers which are able to test slip streams or other selected samples of the stream of interest for these materials. Such analyses can be done on a substantially continuous basis, if desirable.

Industrial streams such as aqueous streams containing dispersed oil, oil containing dispersed aqueous materials and the like are frequently analyzed by such methods. One difficulty in performing such analyses is that frequently small gas bubbles become dispersed in the liquid stream. These bubbles frequently result from the process by which the liquid stream is produced, the method of transportation and the like.

Previously, settling chambers have been used to permit the gas bubbles to rise and separate from the liquid. Such settling chambers have been less than satisfactory since they require a standing period during which the dispersed immiscible liquid or solids can also separate from the liquid stream. It is then difficult to obtain a representative analysis of the stream as initially passed to the settling chamber.

It has been difficult to obtain accurate analyses of streams which contain small gas bubbles using acoustical or optical testing equipment since the presence of gas bubbles in the liquid stream results in inaccuracy in the test results in such equipment. Since it is highly desirable that such equipment be usable on industrial streams containing dispersed materials which may also contain small gas bubbles, a continuing effort has been directed to the development of practical methods for overcoming this problem.

SUMMARY OF THE INVENTION

It has now been found that such liquid streams are readily analyzed in acoustical or optical testers by treating the liquid stream prior to passing the liquid stream to the acoustic or optical tester by a method consisting essentially of increasing the pressure on the liquid stream to an increased pressure sufficient to cause the small gas bubbles to dissolve in the liquid stream to produce a liquid stream containing a reduced number of gas bubbles. In many instances, substantially all of the gas bubbles can be dissolved in the liquid stream by this method.

BRIEF DESCRIPTION OF THE DRAWING

The Figure is a schematic diagram of an embodiment of the present invention.

DESCRIPTION OF A PREFERRED EMBODIMENT

In the Figure a sample liquid stream is passed through a line 10 to a centrifugal pump 12 where the pressure is increased to produce a liquid stream at an increased pressure in a line 14. The liquid stream in line 14 contains a reduced number of gas bubbles and is desirably passed through a length of tubing shown, as a coil 16, at turbulent flow conditions to homogenize the liquid stream and provide an additional opportunity for gas bubbles to dissolve in the liquid stream at the increased pressure. The liquid stream is recovered from tubing 16 and passed through a line 18 to a tester 20 which may be an acoustical or an optical tester as known to those skilled in the art. The liquid stream, after testing, is recovered through a line 22 and optionally returned to the process stream or discharged.

In the practice of the present invention, it is preferred that a centrifugal pump be used because the shearing action of the centrifugal pump tends to homogenize or more finely disperse entrained immiscible solids and small gas bubbles simultaneously with the pressure increase. The resulting liquid stream contains fewer or no gas bubbles and is more homogeneous (reproducible particle size distribution) and more amenable to analysis in acoustical or optical testing equipment. Other types of compression equipment could be used such as positive displacement pumps and the like.

The use of the coil of tubing 16 sized to produce turbulent flow of the liquid stream is also desirable to further mix the stream and facilitate solution of the small gas bubbles.

Tester 20, as indicated previously, may be an acoustical or optical tester as known to those skilled in the art. Further, the tester may be contained in a pressurized compartment to avoid the necessity for testing equipment which will sustain the increased pressure required to dissolve the gas bubbles. Equipment designed to contain the pressure or a container surrounding the test vessel to reduce the differential pressure between the interior of the tester and the atmosphere surrounding the tester could be used. Such variations are considered to be known to those skilled in the art and will not be discussed further.

The pressure required is a pressure sufficient to increase the solubility of the gas comprising the gas bubbles in the liquid stream to a value sufficient to result in dissolving all or a majority of the gas bubbles into the liquid stream. The required pressure will vary widely and the pressure imposed on the liquid stream can be varied as necessary to dissolve the gas bubbles up to the pressure limitations of the equipment. Such variations are well known to those skilled in the art for a variety of fluids. Typically, the streams analyzed are aqueous streams which contain dispersed quantities of oil, finely divided solids or the like along with the small gas bubbles. The solubility of most gaseous substances in water is well known and the desired pressure can readily be determined by those skilled in the art. A pressure increase of at least 30 and preferably at least 50 psia may be used to increase the solubility of the small gas bubbles in the liquid stream.

Having discussed the invention by reference to its preferred embodiments, it is pointed out that the embodiments discussed are illustrative rather than limiting in nature and that many variations and modifications are possible within the scope of the present invention and may be considered obvious and desirable by those skilled in the art based upon the foregoing description of preferred embodiments.

What is claimed is:

1. A method for removing small gas bubbles from a liquid stream to produce a liquid stream having a reduced number of gas bubbles, said method consisting essentially of increasing the pressure on said liquid stream to an increased pressure sufficient to cause said bubbles to dissolve in said liquid stream to produce a liquid stream containing a reduced number of gas bubbles.

2. The method of claim 1 wherein said liquid stream is passed through a centrifugal pump to increase said pressure and produce said liquid stream having a reduced number of gas bubbles.

3. The method of claim 2 wherein said liquid stream containing a reduced number of gas bubbles is passed through a length of tubing at turbulent flow conditions.

4. The method of claim 3 wherein said length of tubing comprises a coil of tubing.

5. The method of claim 3 wherein said liquid stream containing a reduced number of gas bubbles is passed through said length of tubing at turbulent flow conditions and thereafter passed to a testing device to test said liquid stream containing a reduced number of gas bubbles for the presence of suspended materials in said liquid stream containing a reduced number of gas bubbles.

6. The method of claim 1 wherein said liquid stream containing a reduced number of gas bubbles is passed to a testing device to test said liquid stream containing a reduced number of gas bubbles for the presence of suspended materials in said liquid stream containing a reduced number of gas bubbles.

7. The method of claim 6 wherein said tester is an acoustical tester.

8. The method of claim 6 wherein said tester is an optical tester.

9. The method of claim 8 wherein said immiscible liquid is oil and wherein said liquid stream is an aqueous 10. The method of claim 6 wherein said material is a liquid which is substantially immiscible with said liquid stream.

11. The method of claim 6 wherein said material is finely divided particulate solids.

* * * * *